(12) United States Patent
Won et al.

(10) Patent No.: US 7,599,440 B2
(45) Date of Patent: Oct. 6, 2009

(54) DOWNLINK CONTROL CHANNEL ALLOCATION METHOD IN MOBILE COMMUNICATION SYSTEM

(75) Inventors: Seung-Hwan Won, Gyeonggi-Do (KR); Joon-Kui Ahn, Seoul (KR); Young-Soo Yuk, Seoul (KR); Hak-Seong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 647 days.

(21) Appl. No.: 10/845,531

(22) Filed: May 14, 2004

(65) Prior Publication Data
US 2004/0264363 A1 Dec. 30, 2004

(30) Foreign Application Priority Data
May 17, 2003 (KR) .................. 10-2003-0031446

(51) Int. Cl.
H04K 1/10 (2006.01)
(52) U.S. Cl. .................. 375/260; 375/259; 370/69.1; 370/208; 455/59
(58) Field of Classification Search .................. 375/260, 375/259; 370/208, 69.1; 455/59
See application file for complete search history.

(56) References Cited

U.S. PATENT DOCUMENTS

| | | | | |
|---|---|---|---|---|
| 5,729,541 A * | 3/1998 | Hamalainen et al. | ........ | 370/337 |
| 6,091,757 A * | 7/2000 | Cudak et al. | ................. | 375/130 |
| 6,091,761 A * | 7/2000 | Popovic | ...................... | 375/150 |
| 6,108,369 A * | 8/2000 | Ovesjo et al. | ................ | 375/146 |
| 6,163,524 A * | 12/2000 | Magnusson et al. | ......... | 370/208 |
| 6,483,826 B1 | 11/2002 | Åkerberg | | |
| 6,526,091 B1 | 2/2003 | Nystrom et al. | | |
| 6,560,194 B1 * | 5/2003 | Gourgue et al. | ............. | 370/203 |
| 6,563,808 B1 * | 5/2003 | Cox et al. | .................... | 370/335 |
| 2004/0085924 A1 * | 5/2004 | Zhang et al. | ................ | 370/328 |
| 2004/0142695 A1 * | 7/2004 | O'Neill et al. | .............. | 455/450 |
| 2005/0120097 A1 * | 6/2005 | Walton et al. | ............... | 709/220 |
| 2006/0007876 A1 * | 1/2006 | Qian et al. | ................... | 370/320 |

FOREIGN PATENT DOCUMENTS

| | | |
|---|---|---|
| CN | 1228649 | 9/1999 |
| CN | 1299542 | 6/2001 |
| JP | 11-275059 | 10/1999 |

(Continued)

OTHER PUBLICATIONS

Dongwoo Kim ( "Downlink power allocation and adjustment for CDMA cellular systems", IEEE communications Letters, vol. 1, No. 4, Jul. 1997, pp. 96-98).*

(Continued)

Primary Examiner—Shuwang Liu
Assistant Examiner—Helene Tayong
(74) Attorney, Agent, or Firm—Ked & Associates, LLP

(57) ABSTRACT

A downlink control channel structure in a CDMA (Code Division Multiple Access) mobile communication system and its operating method are disclosed. Especially, a downlink control channel structure suitable for using a physical shared channel for a control channel, and a time-code allocating method using the same are disclosed. For this purpose, one shared channel is divided by both time and symbol level of orthogonal codes by using a unit channel.

9 Claims, 5 Drawing Sheets

FOREIGN PATENT DOCUMENTS

| | | |
|---|---|---|
| JP | 2002-95066 | 3/2002 |
| JP | 2002-523922 | 7/2002 |
| JP | 2002-369258 | 12/2002 |
| JP | 2003-134035 | 5/2003 |
| WO | WO 02/093952 | 11/2002 |
| WO | WO 02/098021 | 12/2002 |

OTHER PUBLICATIONS

Japanese Office Action dated Feb. 14, 2008 with Full English Translation.

* cited by examiner

FIG.3

$$H_0 = \begin{bmatrix} + & + & + & + & + & + & + & + & + & + & + & + \\ + & - & + & - & + & + & + & - & - & - & + & - \\ + & + & - & + & + & + & - & - & - & + & - & - \\ + & - & + & + & + & - & - & - & + & - & - & + \\ + & + & + & + & - & - & - & + & - & - & + & - \\ + & + & + & - & - & - & + & - & - & + & - & + \\ + & + & - & - & - & + & - & - & + & - & + & + \\ + & - & - & - & + & - & - & + & - & + & + & + \\ + & - & - & + & - & - & + & - & + & + & + & - \\ + & - & + & - & - & + & - & + & + & + & - & - \\ + & + & - & - & + & - & + & + & + & - & - & - \\ + & - & - & + & - & + & + & + & - & - & - & + \end{bmatrix} \quad H_c = \begin{bmatrix} +1 & +1 \\ +1 & -1 \end{bmatrix}$$

FIG.4

|    | A  | B  | C  | D  |
|----|----|----|----|----|
| 1  | 0  | 24 | 24 | 24 |
| 2  | 1  | 22 | 23 | 24 |
| 3  | 2  | 20 | 22 | 24 |
| 4  | 3  | 18 | 21 | 24 |
| 5  | 4  | 16 | 20 | 24 |
| 6  | 5  | 14 | 19 | 24 |
| 7  | 6  | 12 | 18 | 24 |
| 8  | 7  | 10 | 17 | 24 |
| 9  | 8  | 8  | 16 | 24 |
| 10 | 9  | 6  | 15 | 24 |
| 11 | 10 | 4  | 14 | 24 |
| 12 | 11 | 2  | 13 | 24 |
| 13 | 12 | 0  | 12 | 24 |

A : the number of code channels with length 12
B : the number of code channels with length 24
C : the total number of code channels
D : the number of transmission symbols during transmission interval of 24

DOWNLINK CONTROL CHANNEL ALLOCATION METHOD IN MOBILE COMMUNICATION SYSTEM

BACKGROUND OF THE INVENTION

1. Field of the Invention

The present invention relates to a channel allocation method in a CDMA (Code Division Multiple Access) mobile communication system and, more particularly, to a downlink control channel allocation method suitable for using a physical shared channel as a control channel.

2. Description of the Background Art

In general, a downlink channel in a CDMA IMT-2000 system employs a method of multiplying an orthogonal code such as an orthogonal variable spreading factor (OVSF) or Walsh code to a transmission bit to spread it.

Lately, studies are being conducted to determine a transmission method of a new data dedicated channel in order to increase a transmission rate of uplink in the IMT-2000 system. In case of applying the enhanced data dedicated channel to uplink, a downlink control channel has the following characteristics.

First, it is assumed that new signaling information (control signals) required for operating an enhanced dedicated channel (E-DCH) is required for downlink. In this case, the information can be considered in association with an automatic repeat request (ARQ), scheduling and some other cases. Even though signal information requires high reliability, such signaling information can be multiplexed through a shared channel and transmitted to multiple terminals thanks to its small amount of data. Requirement for a physical channel structure for an L1 signaling at downlink is as follows.

Preferably, the L1 signaling on downlink exists independently from a data dedicated channel of downlink.

Signaling of every user should be transmitted at every transmission time interval (TTI).

In order to reduce a delay phenomenon, signaling should be detected by a terminal before deinterleaving.

Existing methods proposed for the downlink signaling are as follows.

A first method is to transmit signal information by using an existing downlink data/control channel. Namely, in this method, the size of signaling information is not so big that signaling information can be transmitted by changing a frame structure of a downlink control channel or signaling information can be transmitted by using a remaining space after a downlink data channel is punctured. In addition, in this method, signaling information can be also transmitted by increasing a transmission rate of the downlink data channel.

A second method is to use an independent orthogonal code channel. In this method, signaling information is transmitted to each terminal by using an independent orthogonal code channel. In this case, an independent physical channel can be used for transmission of a downlink L1 signaling. The physical channel can be used as a dedicated channel of each terminal or as a shared channel for multiple terminals.

The method of using the independent orthogonal code channel can be divided into a method of using a dedicated channel and a method of using a shared channel. In the method for transmitting signaling information by using the dedicated channel, an independent orthogonal code channel is allocated to each terminal and signaling information is transmitted thereto.

The method of using the shared channel is divided into a method of using time-division shared channel and a symbol-level orthogonal code division multiplexing method.

The method of using a time-division shared channel is to time-divide one orthogonal channel and allocates it to multiple users. Namely, one TTI is divided by the number of users and the divided time interval is allocated to each user to transmit signal information. At this time, the number of bits differs depending on the size of requested signaling information.

The symbol-level orthogonal code division multiplexing method is to transmit signaling information by using an orthogonal signal in units of symbol. Namely, in general, in the CDMA downlink, the orthogonal code channel uses a orthogonal signal in units of chip, and in order to extend the orthogonal code channel, signaling information is transmitted by using the symbol-level orthogonal signal. In this case, the orthogonal signal can be generally extended by using a Hadamard code, and data is transmitted by using the Hadamard code which is able to support the number of a maximum transmission users.

However, considering the downlink physical channel structure required for the case where the data dedicated channel is applied to uplink, the related art signaling transmitting method has the following problems.

1. The Method of Using Existing Downlink Data/control Channel

This method has such problems that an existing channel structure must be changed, a quality of the existing channel can be degraded in case of using the data channel, and it is difficult to secure a sufficient transmission space for transmitting signaling information.

2. The Method of Using the Independent Orthogonal Code Channel

1) Use of the Dedicated Channel

In spite of the flexible and easy channel allocation and operation, the method of using the dedicated channel has the following problems: Because the orthogonal channel of downlink is a critical resource, there is a high possibility that it can not be used sufficiently. In addition, as the number of codes increase, a PAR (Peak to Average Ratio) also increases considerably.

2) Use of the Shared Channel

In Case of Using Time-Division Multiplexing

The time-division multiplexing method in which time is divided has advantages that the PAR does not increase and it can be easily implemented. However, it is disadvantageous in that it is difficult to flexibly allocated a signaling channel according to change in the number of data, and thus, more signaling information is required. In addition, it is difficult to flexibly allocated power according to a channel situation by users (it is difficult to effectively use resources).

In Case of Using Symbol-Level Code-Division Multiplexing

The symbol-level code division multiplexing has an advantage in that because it does not have a time delay, users can transmits signaling information simultaneously, but if there are too many users, the length of the orthogonal code should be lengthened. In addition, the more the number of users or the transmission rate increases, the more orthogonal codes should be used, causing increase in the PAR.

As for the orthogonal code, in order to maintain orthogonality, a channel must not be changed during one period, but if the length of the code is lengthened, the orthogonality may be broken. In addition, if the length of the code is continuously increased to increase available users, a problem arises that the length of the code would exceed a transmission unit.

Moreover, in order to increase the transmission rate, a plurality of orthogonal codes should be allocated to one user.

Then, one user is to receive several orthogonal code channels, complexity of a terminal increases.

SUMMARY OF THE INVENTION

Therefore, a first object of the present invention is to provide a structure of downlink control channel capable of improving transmission of a code channel and allocation efficiency.

A second object of the present invention is to provide a structure of a downlink control channel capable of maintaining a low PAR while supporting various transmission rates by extending a Hadamard code in Sylvester method.

A third object of the present invention is to provide a method for efficiently allocating a control channel by combining merits of time-division multiplexing and symbol-level code division in a downlink control channel using an orthogonal code channel.

A fourth object of the present invention is to provide an efficient power allocating method in a structure of a new downlink control channel.

To achieve at least the above objects in whole or in parts, there is provided a structure of a control channel in a system using a physical shared channel as a control channel for transmitting signaling information, wherein one shared channel is divided by both time and symbol level of orthogonal codes by using a unit channel.

Preferably, a length of the unit channel is determined by a length of a basis Hadamard code, a reference when the unit channel is initially generated.

Preferably, the length of the basis Hadamard code is extended to various lengths so as to be used as a signaling channel.

Preferably, the basis Hadamard code is extended by Sylvester method.

To achieve at least these advantages in whole or in parts, there is further provided a time-code division multiplexing method in a system using a physical shared channel as a control channel for transmitting signaling information, including: classifying each signaling information into groups according to characteristics; allocating the signaling information of the classified groups at code and time intervals; and individually controlling power of each allocated code channel and transmitting each code channel.

Preferably, the channel allocation with respect to each group is made by using a Hadamard code.

Preferably, the length of the basis Hadamard code is extended to various lengths so as to be used as a signaling channel. In this case, the basis Hadamard code can be extended by Sylvester method.

Preferably, power of each code channel is controlled by an uplink transmission power or transmission margin.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 3 illustrates an example of an initial reference matrix and an extension matrix;

FIG. 4 illustrates the number of cases obtained by combining codes of the length of 12 and 24 during a specific transmission interval.

DETAILED DESCRIPTION OF THE PREFERRED EMBODIMENTS

The present invention is implemented in a mobile communication system. However, the present invention can be also applied to a communication system operating according to a different standard.

Preferred embodiments of the present invention will now be described.

The present invention proposes a method for efficiently allocating a control channel by combining merits of the time-division multiplexing and symbol-level code-division in a downlink control channel using an independent orthogonal code channel.

In general, because it is advantageous to adjust transmission power by units of orthogonal code channel, if there are many orthogonal code channels, a power resource can be efficiently allocated. Thus, if the number of orthogonal code channels increases, a problem arises that the PAR increases. In case of the time-division multiplexing, since there is only one orthogonal code channel, it is difficult to distribute bits and individually allocate power according to channel situation by users. Thus, in order to solve such problems, the present invention proposes a new channel structure capable of increasing a code channel by using a short Hadamard code and time-dividing it.

In addition, the present invention proposes a new channel structure capable of maintaining a low PAR while supporting various transmission rates by putting an eye on the fact that the Hadamard code can be extended by Sylvester method.

Moreover, the present invention proposes a method for individually allocating power to the newly proposed channel structure for an effective use of power.

Power of the transmission channel can be applied differently to every Hadamard code channel.

In order to effectively distribute power in a downlink shared channel, characteristics of the downlink channel of each user should be known. However, requesting each user to report characteristics of a downlink channel through uplink for the small amount of signaling information causes a severe channel waste, so a different reference needs to be used. In general, in a system such as the E-DCH or the 3GPP2 Release-D, transmission power or a transmission power margin is to be reported for scheduling, and the information (the transmission power or transmission power margin) has a substantially close relation to propagation attenuation in downlink. Thus, the present invention proposes using the information to determine downlink channel power.

The time-code division multiplexing method will be described in detail as follows.

Control Channel Structure of Time-Code Division Multiplexing

Figure 1:
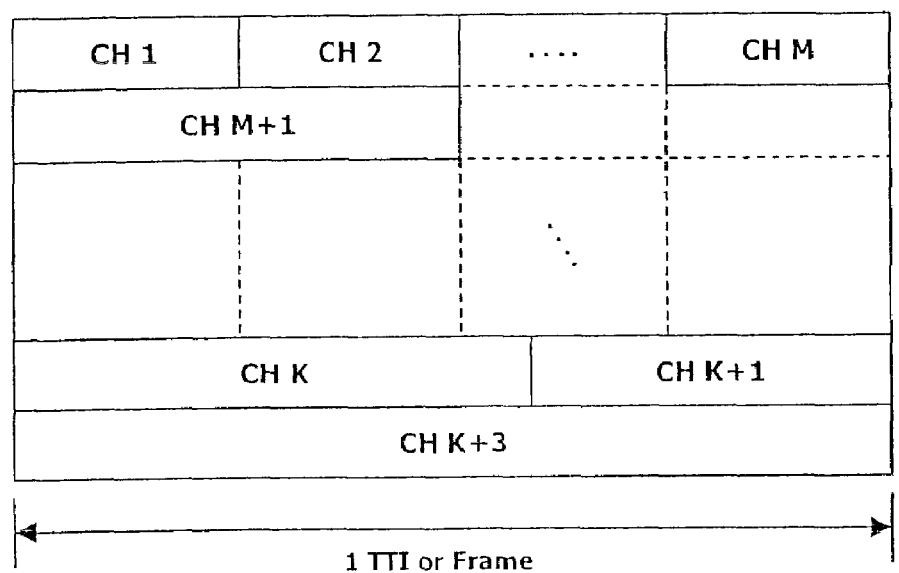
FIG. 1 is a conceptual view showing signaling channel allocating method using time-code division multiplexing technique in accordance with a preferred embodiment of the present invention.

FIG. 1 is a conceptual view showing signaling channel allocating method using time-code division multiplexing technique in accordance with a preferred embodiment of the present invention.

As shown in FIG. 1, dividing one transmission time interval (TTI) into M number of sections forms a basic allocation unit of a control channel, which is defined as a unit (basic) channel. A length of the unit channel is determined according to a length of the Hadamard code, a reference of an initial generation. In this case, a short Hadamard code becomes the initial generation basis in order to enhance transmission allocation efficiency, which is defined as a basic Hadamard code.

If the basic Hadamard code is too short, the overall number of available orthogonal codes can be limited, whereas, if the basic Hadamard code is too long, the orthogonality can be broken according to characteristics of a transport channel. Thus, the basic Hadamard code should be allocated with a suitable length according to a structure of a system and a service environment.

The basic Hadamard code can be extended to a new Hadamard code through Sylvester method, and a length of the extended Hadamard code is integer multiple of the basic Hadamard code. Thus, basic Hadamard code channels (CH1~CHM) can be respectively allocated to one unit channel or one extended Hadamard code channel (CHM+1, . . . , CHK+1) can be allocated to several unit channels. One information symbol is transmitted through such Hadamard code channel, and the number of transmission bits can differ depending on a modulation method.

In the present invention, power of the transport channel can be applied differently to each Hadamard code channel. In order to efficiently distribute power in the downlink shared channel, characteristics of downlink channel of each user should be known. However, requesting each user to report characteristics of a downlink channel to transmit a small amount of signaling information causes a severe channel waste, so a different reference needs to be used. In general, in a system such as the E-DCH or the 3GPP2 Release-D, transmission power or a transmission power margin is to be reported for scheduling, a value of which, however, has a substantially close relation to propagation attenuation in downlink. Thus, in the present invention, transmission power or a transmission power margin of the terminal is used to determine downlink channel power.

Orthogonal Code Channel Structure and Its Generating and Extending Method

First, if $n_0$-dimensional Hadamard matrix, making a reference, is $H_0$, it can be extended to an extended matrix $H_1$ by an extension matrix $H_{e1}$, a $n_{e1}$-dimensional Hadamard matrix. The extended matrix ($H_1$) can be consecutively extended to an extended matrix $H_2$ by an extension matrix $H_{e2}$. The dimension of the extended matrix can be obtained by multiplying $n_{ei}$ to a dimension of a matrix before being extended. Thus, k-th order extended $n_k$-dimensional Hadamard matrix can be expressed by equation (1) shown below:

$$H_k = H_0 \times H_{e1} \times \ldots \times H_{ek} \quad (1)$$

Every row of $H_k$ can be obtained by combining arbitrary rows of $H_{k-1}$ in series.

Figure 2:
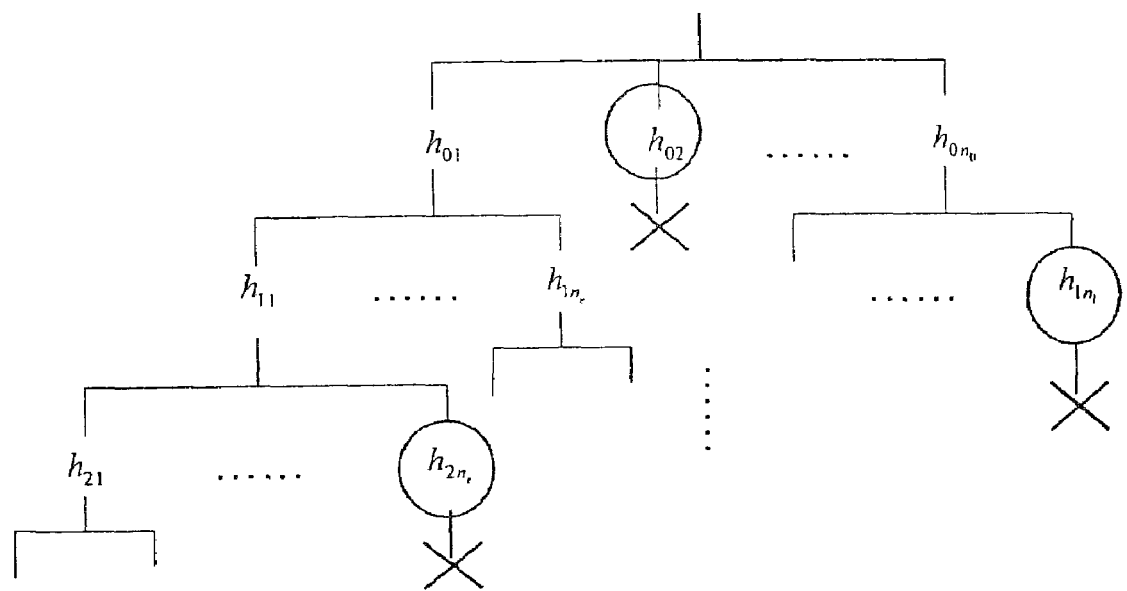
FIG. 2 illustrates an extended tree of a Hadamard code for signaling.

The extending process forms a tree structure as shown in FIG. 2. In FIG. 2, $h_{ij}$ is the jth row vector of $H_i$, forming an orthogonal code of length of $n_i$. The maximum number of orthogonal codes that may be generated in the tree structure is $n_k$, and whenever a shorter code is selected, the number of available codes is exponentially reduced.

If $n_0 = p+1$ (p is a prime factor) and $n_0 \equiv 0 \pmod 4$ in the initial reference matrix ($H_0$), then the basic Hadamard code can be generated by a quadratic residue method, and the generated basic Hadamard matrix ($H_0$) forms a circular Hadamard matrix as shown in FIG. 3. At this time, the other remaining matrixes except for the first row and column of $H_0$ has a circulation transition structure. In such a structure, if only one orthogonal code vector and an offset are known for detection of the Hadamard code, every code channel can be decoded and thus complexity of a terminal can be reduced.

First, if the initial reference matrix and the extension matrix are defined as shown in FIG. 3, first order1 extended matrix using them can be expressed by equation (2) shown below:

$$H_1 = \begin{bmatrix} H_0 & H_0 \\ H_0 & -H_0 \end{bmatrix} \quad (2)$$

A usable length of the code channel can be divided into two case of 12 and 24. If a transmission interval with the length of 24 is assumed, two symbols can be transmitted through a code channel with the length of 12 and one symbol can be transmitted through a code channel with the length of 24.

If [+1, +1, +1, +1, +1, +1, . . . , +1] is selected as a code channel, the extended code with the length of 24 cannot be used. Namely, in case of the code extended by one Hadamard code cannot be used if an upper-level code is used, and such a concept is as shown in FIG. 2. The number of unavailable codes has the same value as the dimension of $H_e$. The number of cases of combining the codes 12 and 24 is as shown in FIG. 4.

With reference to FIG. 4, although the number of transmission symbols are the same with each other in every case, the number of code channels differs. In general, as the number of code channels is reduced, the PAR is advantageously reduced. But if a long code is used, a greater spread rate is used, so that an SNR gain of 3 dB can be obtained in case of transmitting a symbol by using the same power. Thus, a tactful combination in consideration such trade-off can allow allocation of suitable signaling channels to various users.

Figure 5:
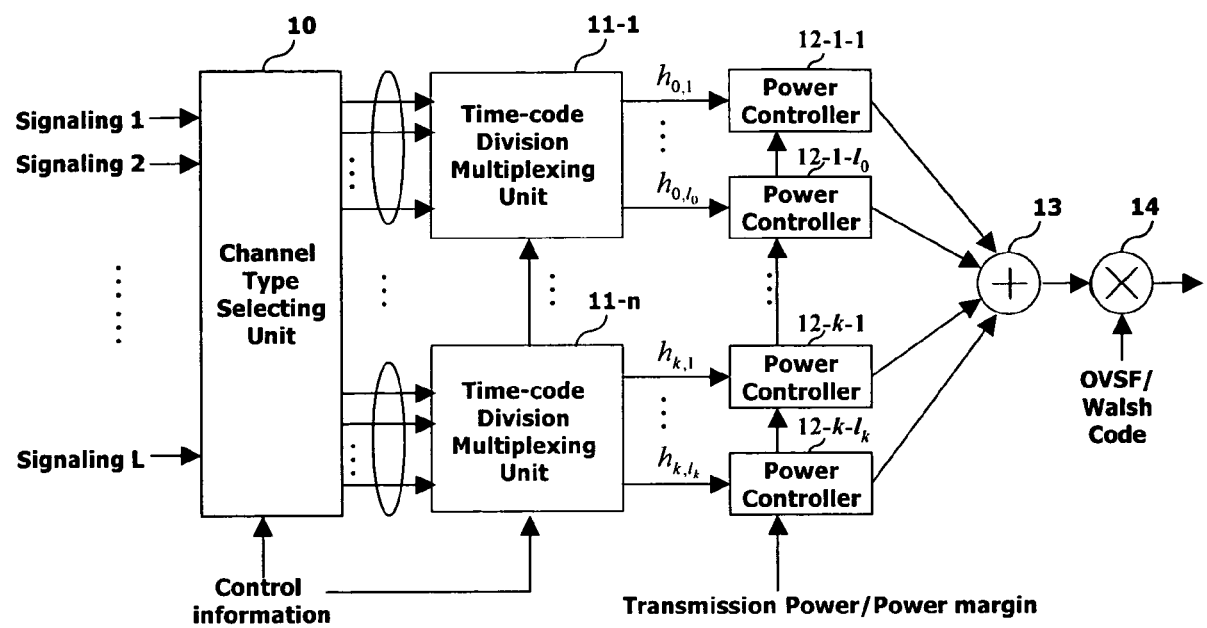
FIG. 5 is a block diagram when a time-code division multiplexing technique is applied to a CDMA system in accordance with the preferred embodiment of the present invention.

FIG. 5 is a block diagram when the proposed downlink signaling channel is applied to the CDMA system.

With reference to FIG. 5, when signaling information is received from each user (terminal), a channel type selecting unit 10 classifies every signaling information into certain groups according to each length of channel codes by using control information of an upper layer. An actual orthogonal code and time section are allocated to the information of each classified group in a time-code division multiplexing units 11-1~11-n, modulated, and then, power-controlled in power controllers 12-1-1~12-1-/0 and 12-k-1~12-k-/k by code channels. In this case, the power controllers differently set power of a transport channel for each Hadamard code channel by using transmission power or a transmission power margin reported from users (terminals) for scheduling.

Thereafter, the respective power-controlled code channels are combined in a combining unit 13 and channelized according to an OVSF or a Walsh function in a channelizing unit 14.

When the downlink control channel structure in accordance with the present invention is applied to the 3GPP E-DCH system, transmission is made by units of TTI and TTI is 2 ms or 10 ms. In this case, if it is assumed that a data symbol is band-spread by a spreading factor (SF=64), the number of 3GPP symbols existing in one TTI is 120 (2 ms) and 600 (10 ms), respectively. If SF=64 and a code channel is generated on the basis of a Hadamard code with a length of 12 or 20, 10 (2 ms) and 50 (10 ms) unit channels are generated in the case that the length of the Hadamard code is 12, and 6 (2 ms) and 30 (10 ms) unit channels are generated in the case that the length of the Hadamard code is 20. In this case, the number of data symbols transmittable in one TTI is 120 (2 ms) and 600 (10 ms), respectively. At this time, signaling information can be allocated to the code channels with the length of 12 and 24 or 20 and 40 and used according to characteristics of signaling information as requested.

If it is assumed that a symbol is band-spread by a spreading factor SF=128 for high reliability, the number of 3GPP symbols existing in one TTI is 60 (2 ms) and 300 (10 ms), respectively. Thus, when a code channel is generated on the basis of a Hadamard code with a length of 12 or 20, 5 (2 ms) and 25 (10 ms) unit channels are generated in the case that the length of the Hadamard code is 12 and 3 (2 ms) and 15 (10 ms) unit channels are generated in the case that the length of the Hadamard code is 20. In this case, the number of data symbols transmittable during one TTI is 60 (2 ms) and 300 (10 ms), respectively.

If an extended Hadamard code is used, 60 and 300 are not divided by the length of 24 or 40 without a remainder, so in this case, a method can be employed in which sections of the code channel using 24 or 40 are defined to multiple sections and other remaining sections uses an orthogonal code with the length of 12 or 20.

In the case of 3GPP2, transmission is made by units of frame, and as the frame unit, 5 ms, 10 ms and 20 ms are considered. If SF=128, then 48, 96 and 192 symbols are transmitted during each frame interval, and in this case, if the unit channel with the length of 12 is used, the code channel (Hadamard code) can be extended to 24 and 48 or the like. Thus, like in the 3GPP, signaling information can be allocated to the code channels with the length of 12, 24, 48 or the like for use according to characteristics of each signaling information.

Channel Allocation Rule

Channel allocation can be determined by multiple references, and the number of simultaneous users, a transmission data rate of individual user, a channel situation of an individual user, transmission power of a base station and an output PAR at a base station transmission amp are the most critical references. The present invention proposes the following channel allocation reference to effectively use power at a viewpoint of a base station.

Users having the similar geometrical or downlink channel characteristics are classified to a group, and the same code channels are allocated to each user group and a code channel is transmitted with optimum transmission power. A group requesting low power or a high transmission rate is allocated to a short Hadamard code channel, and a group requesting high power or a low transmission rate is allocated to a long Hadamard code channel.

In this case, the group allocation is performed according to a requested SNR (Signal to Noise Ratio) and a transmission rate of each user, and a detailed classification reference is a selection factor of a system designer. Accordingly, in allocating a channel with respect to a group, a long code channel is preferentially allocated to a channel which has a high SNR and a low transmission rate. A detailed channel assign rules are as follows.

1. If $$\frac{N_b}{N_g n_0} < \frac{1}{k},$$

the 'k' number of basis Hadamard codes are allocated to a group 'g', and $$N_g - k \frac{N_b}{n_0}$$

bit is moved to the next group g+1

2. $P_g$, $N_g$ and $P_{g,b}$ are calculated with respect to the group 'g'

3. If $P_{g,b} > 2^{n-1} P_{th}$, a base station extends the allocated basis Hadamard codes n-dimensionally and allocates transmission bits 4. Transmission power corresponding the group 'g' is determined as $P^{g,b}/n$ 5. The above process is repeated for every group wherein $N_b$ is the total number of transmittable bits in one transmission TTI/Frame, $N_g$ is the number of transmission bits belonging to the group 'g', and $P_g$ is total request power for transmitting the bits belonging to the group 'g'. In addition, $P_{g,b} = P^g/N_g$: average request power per bit of the group 'g', and $P_{th}$ indicates a maximum power limit for downlink transmission.

Figure 6:
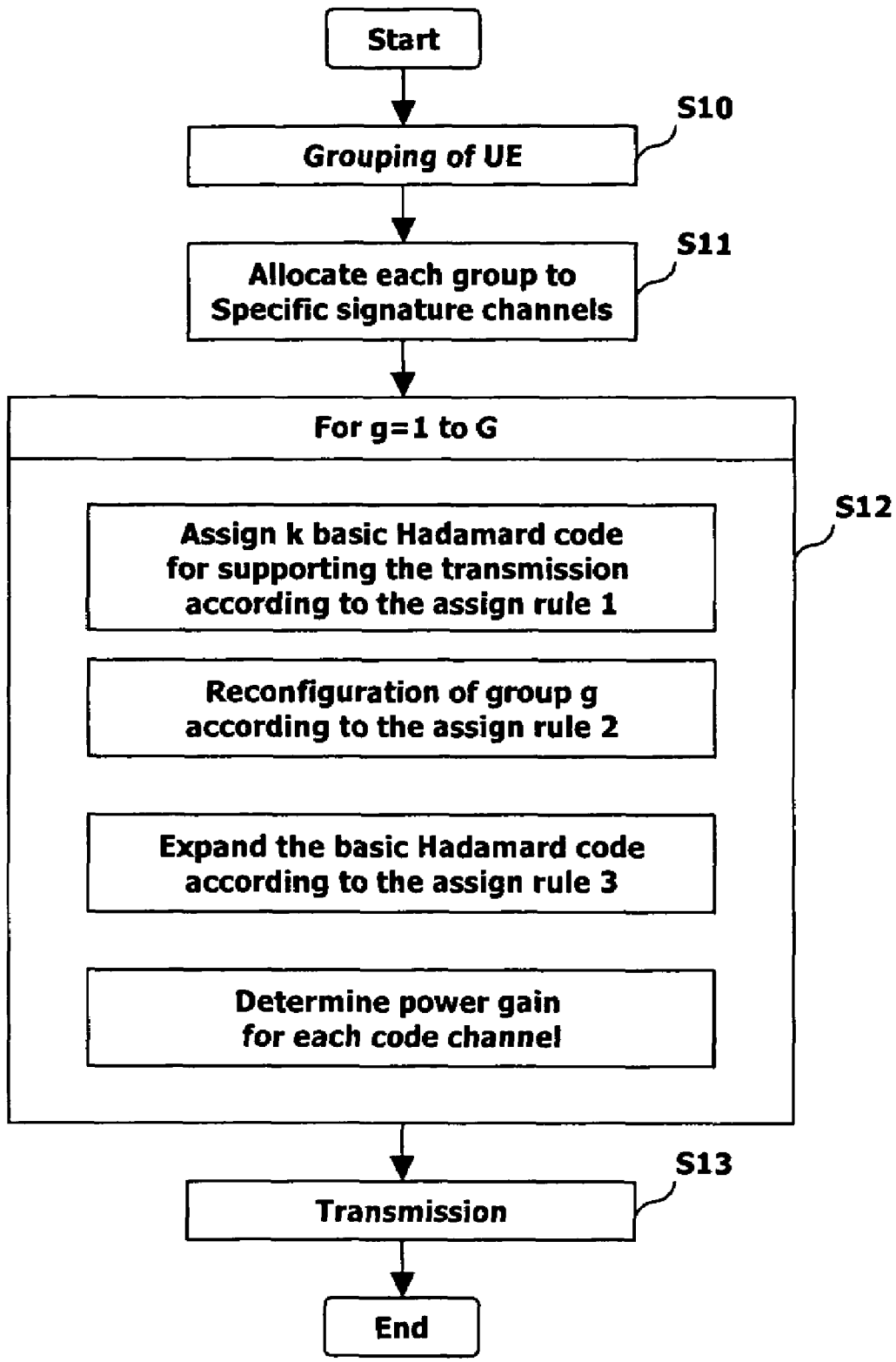
FIG. 6 is a flow chart of the signaling channel allocating method using the time-code division multiplexing technique in accordance with the preferred embodiment of the present invention.

As shown in FIG. 6, users having the similar geometrical or downlink channel characteristics are grouped (step S10), and specific signature channels are allocated to each group (step S11). Subsequently, K number of basic Hadamard codes are allocated to the group g according to the number of transmission bits as shown in the assign rule 1 and $P_g$, $N_g$ and $P_{g,b}$ for the group g are calculated according to the allocation rule 2. Also. The group g is reconfigured according to the assign rule 2.

Thereafter, as shown in the assign rule 3, the base station checks whether the average request power ($P_{g,b} = P_g/N_g$) per bit of the group g is larger than the maximum transmission power (Pth), and if the average request power per bit is larger than the maximum transmission power, the base station extends the basis Hadamard code n-dimensionally and then allocates transmission bits.

Once the transmission bits are allocated, transmission power corresponding to the group g, namely, transmission power of the extended Hadamard code channel is determined. This operation is repeatedly performed for every group at a step S12. When the channels are allocated to every group and the transmission power of the allocated channel is determined, the transmission step S13 is performed.

As so far described, the present invention has the following advantages.

That is, by combining the merits of the time-division multiplexing and the symbol-level code division in the downlink control channel using the independent orthogonal code channel, signaling information can be flexibly allocated to a control channel.

In addition, since the channel is generated by extending the basis Hadamard code by Sylvester method, a low PAR can be maintained while supporting various transmission rates, and especially, high transmission efficiency can be obtained by using a small amount of power through the power controlling between individual codes.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A downlink control channel allocation method performed in a mobile communication system, comprising:
   forming one or more orthogonal code channels, wherein said forming comprises dividing one transmission time interval (TTI) to form one or more basic allocation units of a control channel by using a first orthogonal code, and extending the one or more basic allocation units to the one or more orthogonal code channels by using a second orthogonal code;
   allocating the one or more orthogonal code channels to each classified group or each terminal, wherein the one or more allocated orthogonal code channels are allocated thereto with a time division multiplexing and a code division multiplexing;
   determining a transmission power of each orthogonal code channel to transmit an information symbol, wherein the transmission power is differently applied to each orthogonal code channel based on transmission information or transmission power margin information reported from a user for scheduling, wherein a short Hadamard code channel is allocated to a group requesting low power or a high transmission rate and a long Hadamard code channel is allocated to a group requesting high power or a low transmission rate; and
   transmitting an information symbol through one of the orthogonal code channels, wherein a length of the first orthogonal code determines a number of available orthogonal codes and characteristics of a transport channel for the one or more orthogonal code channels.

2. The method of claim 1, wherein the first orthogonal code is Hadamard code generating a length of the basic allocation unit, and the second orthogonal code is Hadamard code extended by a Sylvester method, and the extended Hadamard code has a length that corresponds to an integer multiple of the first orthogonal code.

3. The method of claim 2, wherein the basis Hadamard code is extended to a new Hadamard code by Sylvester method.

4. The method of claim 1, wherein a channel requesting a high signal-to-noise (SNR) and low transmission rate is preferentially allocated to a long Hadamard code channel.

5. A downlink control channel allocation method performed in a mobile communication system comprising:
   forming one or more orthogonal code channels to perform a time division multiplexing and a code division multiplexing, wherein said forming comprises multiplexing a shared channel into a plurality of unit channels in one transmission section, and allocating one or more variable orthogonal code channels to the multiplexed unit channels according to a size of control information to be transmitted,
   wherein when allocating the one or more variable orthogonal code channel, users having the similar geometrical or downlink channel characteristics are classified to a group, and the same variable orthogonal code channels are allocated to each user group;
   transmitting the control information through one of the allocated variable orthogonal code channels, wherein a length of each unit channel is determined by a length of an initially generated basis Hadamard code, the variable orthogonal code channel corresponding to a Hadamard code channel extended from a basis Hadamard code channel, and wherein a length of the extended Hadamard code is integral multiple of a length multiple of a length of the basis Hadamard code; and
   applying power differently to each Hadamard code channel based on transmission power margin information reported from a user terminal for scheduling, wherein a short Hadamard code channel is allocated to a group requesting low power or a high transmission rate and a long Hadamard code channel is allocated to a group requesting high power or a low transmission rate.

6. The method of claim 5, wherein the unit channel is a basic allocation unit of a control channel.

7. The method of claim 5, wherein the length of the basis Hadamard code is determined according to the number of available orthogonal codes and characteristics of a transport channel.

8. The method of claim 5, wherein the basis Hadamard code is extended to a new Hadamard code by a Sylvester method.

9. The method of claim 5, wherein the basis Hadamard code channel is allocated to one unit channel or one extended Hadamard channel code is allocated to several unit channels.

* * * * *